April 8, 1930.   R. B. WASSON   1,753,675
APPARATUS AND METHOD FOR TESTING GASES
Filed Oct. 24, 1925   6 Sheets-Sheet 1

Fig. 1.

INVENTOR
Robert B. Wasson
BY
ATTORNEY

April 8, 1930.  R. B. WASSON  1,753,675
APPARATUS AND METHOD FOR TESTING GASES
Filed Oct. 24, 1925   6 Sheets-Sheet 5

INVENTOR
Robert B. Wasson
BY
ATTORNEY

April 8, 1930.	R. B. WASSON	1,753,675
APPARATUS AND METHOD FOR TESTING GASES
Filed Oct. 24, 1925    6 Sheets-Sheet 6

Patented Apr. 8, 1930

1,753,675

UNITED STATES PATENT OFFICE

ROBERT B. WASSON, OF CRANFORD, NEW JERSEY

APPARATUS AND METHOD FOR TESTING GASES

Application filed October 24, 1925. Serial No. 64,650.

My invention relates to an apparatus and method for determining the composition of gases and particularly for determining the efficiency of combustion of the fuel used in an internal combustion engine, the invention enabling one to determine the amount of carbon dioxide present in the products of combustion of gases, such as that present in the exhaust gas of an integral combustion engine. The operator may thus determine the combustion efficiency of the engine and may also adjust the carburetor so that the engine may give the desired output.

One of the objects of the invention is to provide a testing apparatus and method by means of which the chamber in which the test is conducted may be purged of all air or gas by forcing a portion of an absorbing liquid through the chamber so as to fill it, thereby expelling the gas which has been tested, the gas to be tested being thereafter admitted into the chamber.

Another object of the invention is to provide a means enabling the readings to be taken without the readings being affected either by the amount of gas tested or the pressure under which it is delivered before the test is made.

Another object of the invention is to provide a means enabling the readings to be taken in a chamber free from temperature and pressure changes coming from the outside of the chamber.

With the above and other objects in view, my invention consists in the parts, improvements and combinations more fully pointed out hereinafter.

Referring now to the drawings:

Figure 2, is a top plan view of the apparatus.

Figure 2ª, is a detail cross-section on line 2ª—2ª, of Figure 2.

Figure 3, is a transverse section on line 3—3 of Figure 1.

Figures 4, 5 and 6, are vertical sectional detail views of the lower portion of the pump and liquid distributing system on section lines, 4—4, 5—5 and 6—6, respectively, shown in Figure 3.

Figure 6ª, is a horizontal section on line 6ª—6ª, of Figure 6.

Figure 7, is a vertical sectional view of the pump.

Figure 8, is a side elevation of the manometer or gage for giving the pressure translated into combustion efficiency and carbon dioxide percentages.

Figures 15, 16, 17, 18, 19 and 20, show the upper and lower valve mechanism in their three positions, the upper valve being in section.

Figures 15ª, 15ᵇ, 16ª, 16ᵇ, 17ª, 17ᵇ, 18ª 18ᵇ, 19ª, 19ᵇ and 20ª, 20ᵇ, are cross-sectional views of the valves taken on the corresponding Figures 15, 16, 17, 18, 19 and 20.

In the drawings, two chambers are provided, which in the form of the invention illustrated, comprise an inner chamber 10 and an outer chamber 11. These are preferably composed of glass so as to permit the filling and displacing operations occurring inside of the chambers to be readily seen. The outer chamber is of larger diameter than the inner chamber so as to provide a space between their walls, which serves as a reservoir for liquid.

The ends of the inner and outer chambers are clamped between two plates 12, 13, gaskets 14, being provided to insure a liquid tight fit. The glass, the plates and the gaskets are made of materials not attackable by the gas and solutions used. The lower plate 13, is provided with legs 15, upon which the apparatus stands. Screw-threaded connecting rods 16, provided with nuts 17, are used to clamp the plates and chambers together, and to guard the outer chamber wall from breakage, the connecting rods passing thru perforations in the upper and lower plates. Filling holes for the inner and outer chambers may be kept closed by means of screw plugs 18, 19. By suitable manipulation of the opening plugs 18, 19, the vacuum may be broken between the inner and outer chambers and the inner chamber filled with liquid and thereafter with exhaust gas.

After filling the outer chamber, thru the filling hole at 18, with a combining solution such as alkaline solution, for example caustic potash solution, and after pouring a protecting film of an inert liquid, such as kerosene into the inner chamber at 19, the caustic liquid is pumped from the outer chamber to the inner chamber so as to fill the inner chamber with liquid, thus displacing the gas originally therein. Means are provided for accomplishing this result. These means, in the form of the invention illustrated, include a pump, a lower valve mechanism and an upper valve mechanism.

The pump 20, is provided with a barrel 21, and a piston 22, the top of the barrel being screw-threaded to receive a threaded nut 23, which compresses the packing 24, so as to provide a seal. The pump piston 22, may be provided with a pin 25, which when it registers with the slot 26, will permit the piston to be moved up and down by handle 27 (see Fig. 7). The piston may be locked down into a fixed position (as when admitting the specimen of gas and when measuring with the manometer), by turning the pin 25, into groove 28, in the nut 23. The lower end of the barrel 21 is screw-threaded at 29, so that it may be screwed into the bottom clamping plate of the apparatus.

Figures 4, 5, 6, 6A, 7, 8:
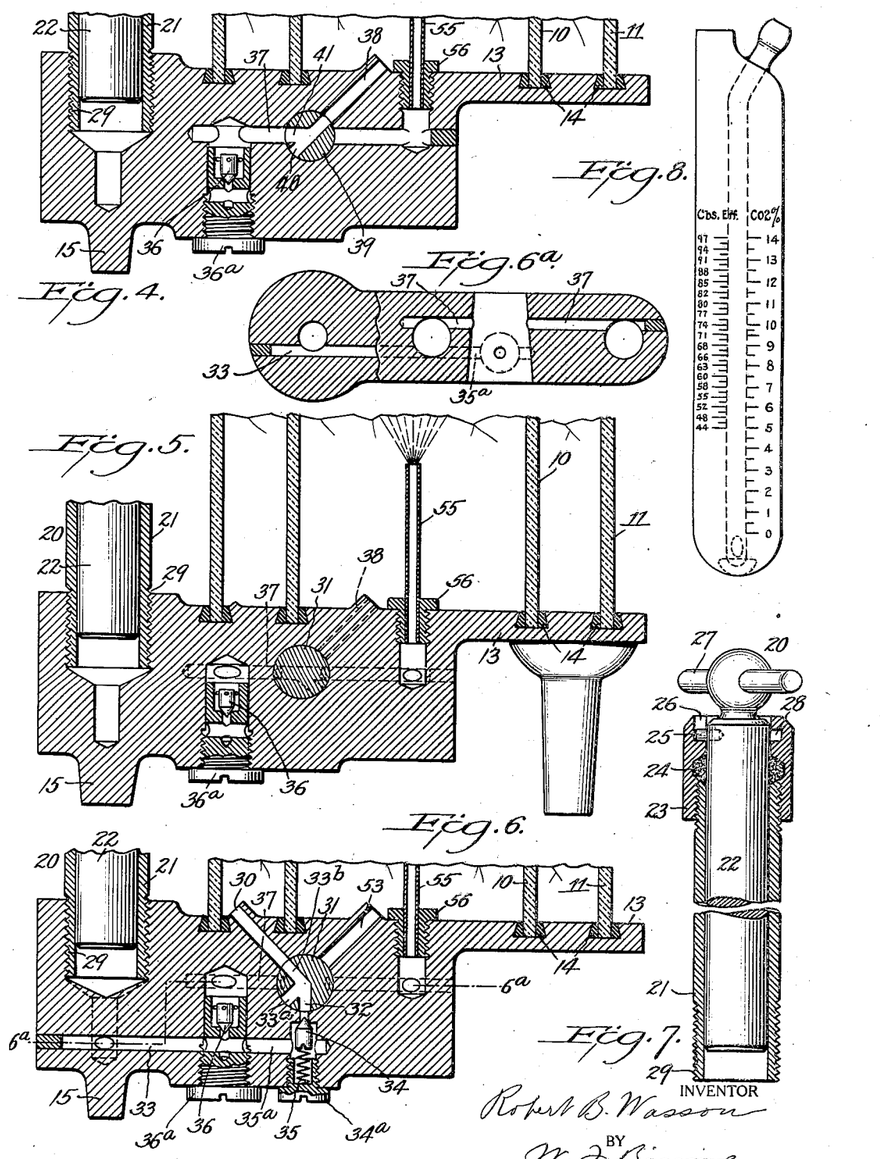
Figure 12:
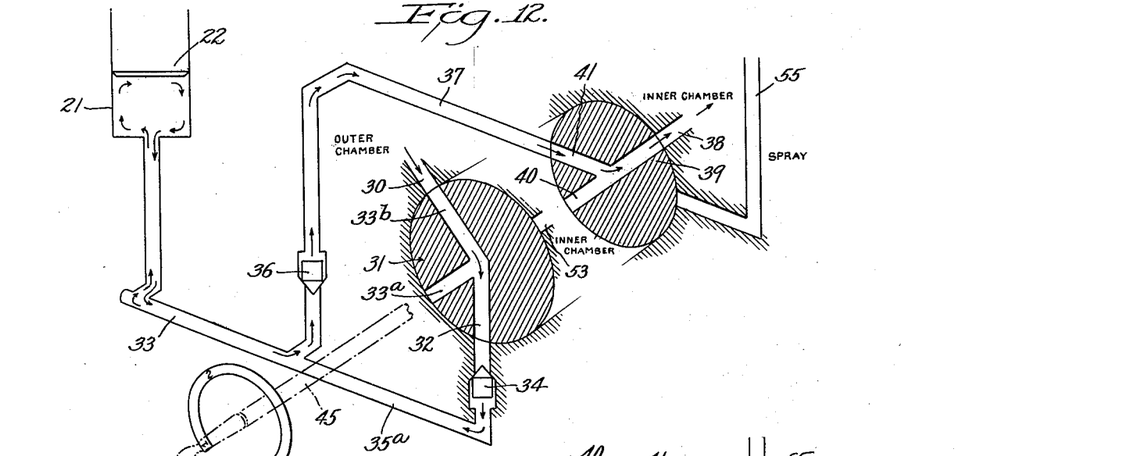
Figures 12, 13 and 14, are three diagrammatic views showing the operation of the pump, the lower valve mechanism and the spray.

Referring to Figures 12, 6 and 4, it will be observed that the pump barrel 21, is connected with the inner and outer chamber by means of a main and two branch passageways. Two lower valves mounted upon a common valve body are provided and the upper valve mechanism, likewise, comprises two valves. On the suction stroke of the pump, liquid is sucked from the outer chamber thru the forward lower valve into the pump barrel by way of one of the branch passages and the main passageway. On the ejecting stroke of the pump, this liquid is forced thru the main passage by way of the other branch passageway and the rear lower valve into the inner chamber. More particularly speaking, the outer chamber 11, is connected by passageway 30, to the front portion of the valve chamber in which the lower valve 31, is located. In the lower front valve, two passageways 32, 33$^a$, are provided, the passageway 32 (with its branch 33$^b$), when in the position shown in Figs. 6 and 12, establishing a connection between the outer chamber and the main passageway 33, to the pump, by way of check valve 34, pressed by spring 35, and branch passageway 35$^a$. The check valve 34, is mounted in a removable screw plug 34$^a$, which can be removed to clean the valve chamber.

On the suction stroke of the pump, liquid flows from the outer chamber 11, thru this passageway past the check-valve into the main passageway 33 and the pump. On the ejecting stroke of the pump, liquid flows from the pump barrel into passageway 33, thru check-valve 36, mounted in removable screw-plug 36$^a$, into back branch passageway 37 (see Figs. 4, 12), thru which the liquid flows on its way to the back discharge pipe 38, thru the back lower valve 39. This back lower valve is provided with openings 40, 41, opening 41, in the position shown in Figure 4, permitting the liquid to flow as described. This position of the back lower valve shown in Figure 4, corresponds to the position of the front lower valve shown in Figure 6. Figure 6, shows the intake of liquid by the pump and Figure 4, shows the ejection of liquid into the inner chamber.

After the inner chamber has been filled with liquid, the liquid will rise thru the neck 42, above the glass-covered peep hole 43, thus showing that the chamber has been filled.

Figure 9:
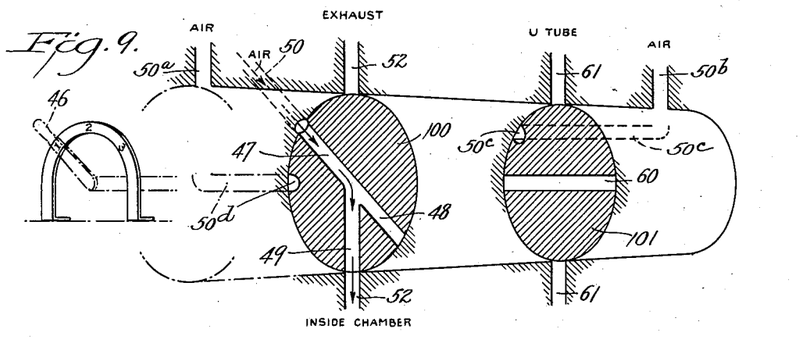
Figures 9, 10 and 11, are three diagrammatic views showing the operation of the upper valve mechanism.
Figure 10:
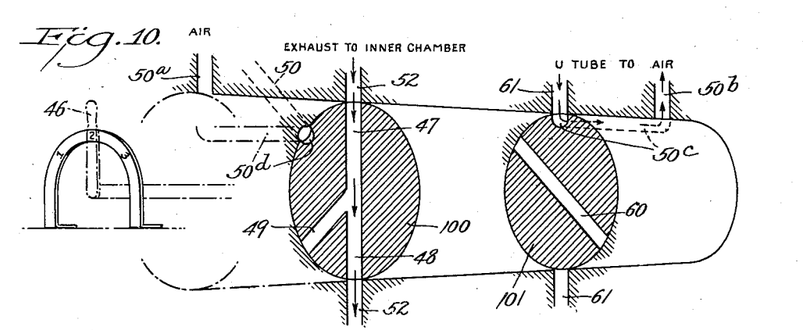
Figures 15, 15A, 15B:
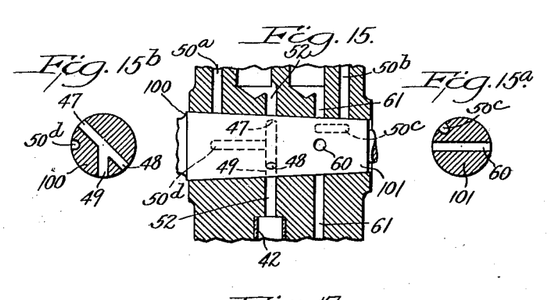
Figures 16, 16B:
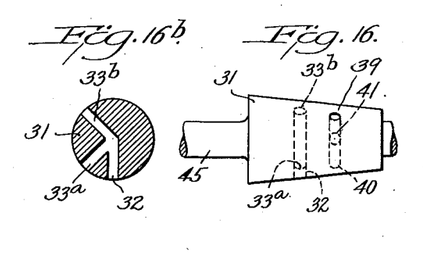
Figure 16A:
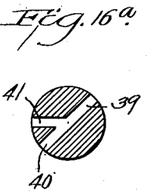
Figures 17, 17A, 17B:
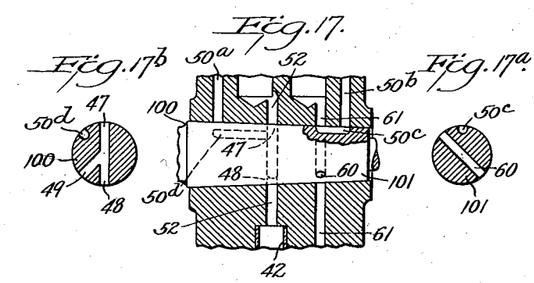
Figure 18:
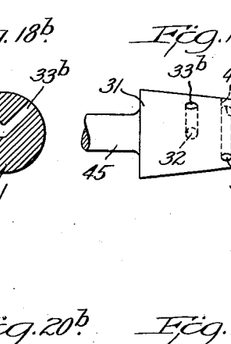
Figure 18A:
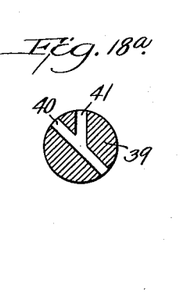
Figures 19, 19A, 19B:
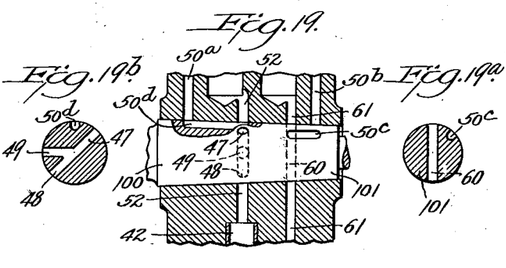

With the lower valve mechanism in the position shown in Figures 4 and 6, and while the pumping operation is taking place to fill the inner chamber with caustic solution, on the top of which floats a kerosene seal, the lower valve mechanism having its operating handle 44, attached to valve shaft 45, will be in position 1, see Figure 12. This corresponds to the valve position shown in Figure 16. The upper valve mechanism (see Fig. 1) provided with its operating handle 46, will also be placed in its position 1, see Figure 9. This corresponds to the valve position shown in Figure 15.

With the upper valve mechanism in its position 1, the inner chamber will be connected to atmosphere, thus permitting the operation of filling the inner chamber with liquid to go on. The upper valve mechanism is provided with a front valve 100, near the handle, and a rear valve 101. The front valve which is provided with ports 47, 48, 49, when in position 1, will connect the neck 42 of the inner chamber thru ports 49, 47, with the air port 50.

Figures 2, 2A, 3:
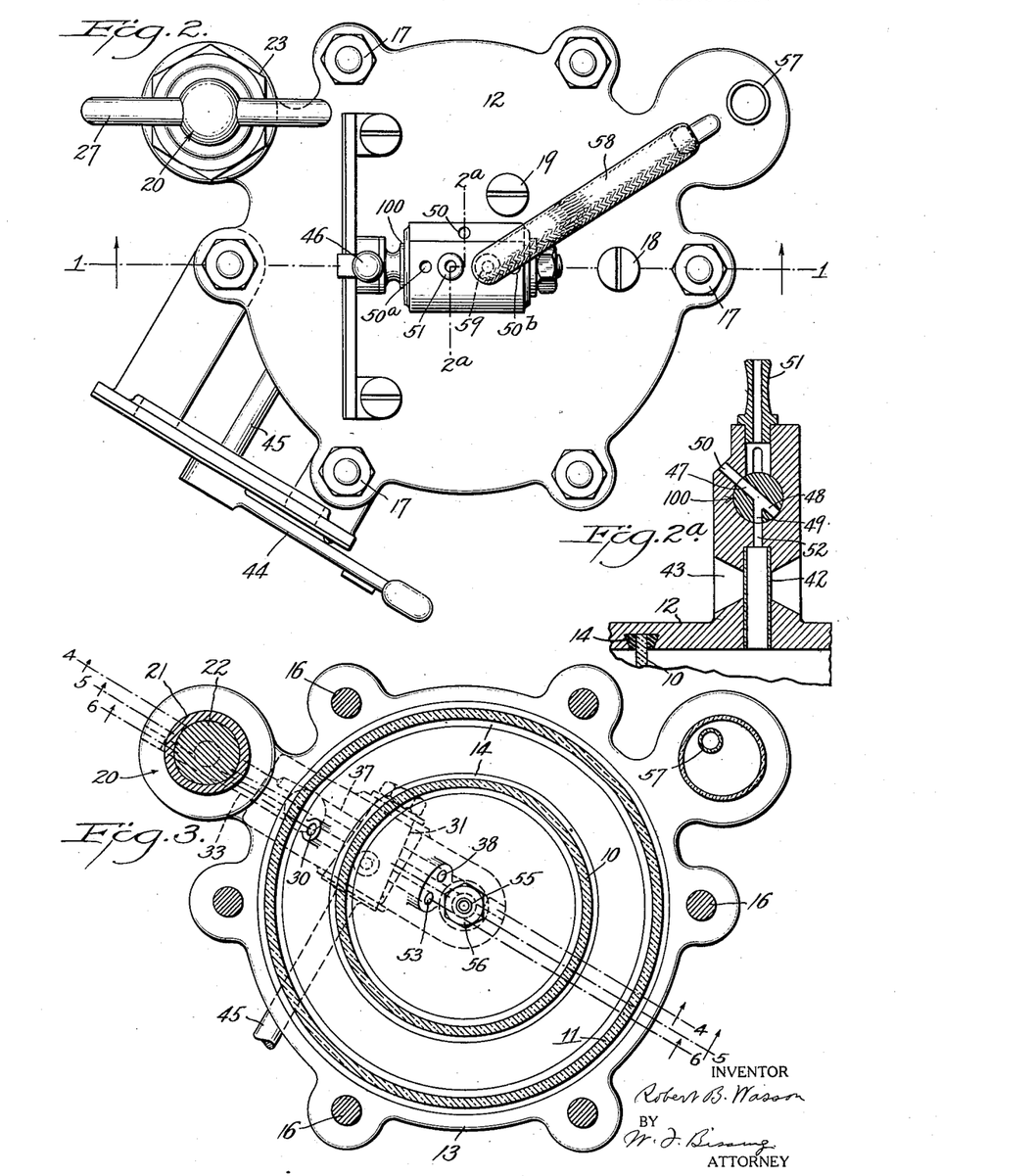

After the inner chamber has been thus filled, the lower and upper valves are turned to their respective positions 2 (see Figures 13, 10, 18 and 17). In this position the front lower valve, thru its ports 33$^a$ and 33$^b$, and passageways 30 and 53, passageway 53, being at one side of the passageway 38, see Figure 3, will connect the outer chamber with the inner chamber.

The upper front valve by means of its ports 47, 48, when the valve is in position 2, can now be made to connect the inner chamber with the exhaust pipe of the internal combustion engine. A flexible hose 51$^a$, is coupled to the engine (not shown) and to the nipple 51. This provides a connection to the inner chamber from the nipple 51, thru passageway 52. By supplying the exhaust gases thru nipple 51 to the inner chamber, the level of the liquid in the inner and outer chambers assume substantially the same level. This may be checked by the manometer which, when connected with the inner chamber, will remain at its zero position. The gas being tested is thus under atmospheric pressure no matter what amount of gas has been delivered, nor what the pressure in the exhaust pipe may be, under which the gas was delivered. This condition of pressure is maintained thru the subsequent testing steps, the inner and outer chambers being disconnected during the subsequent steps so as to preserve this condition of pressure.

Figures 13, 14:
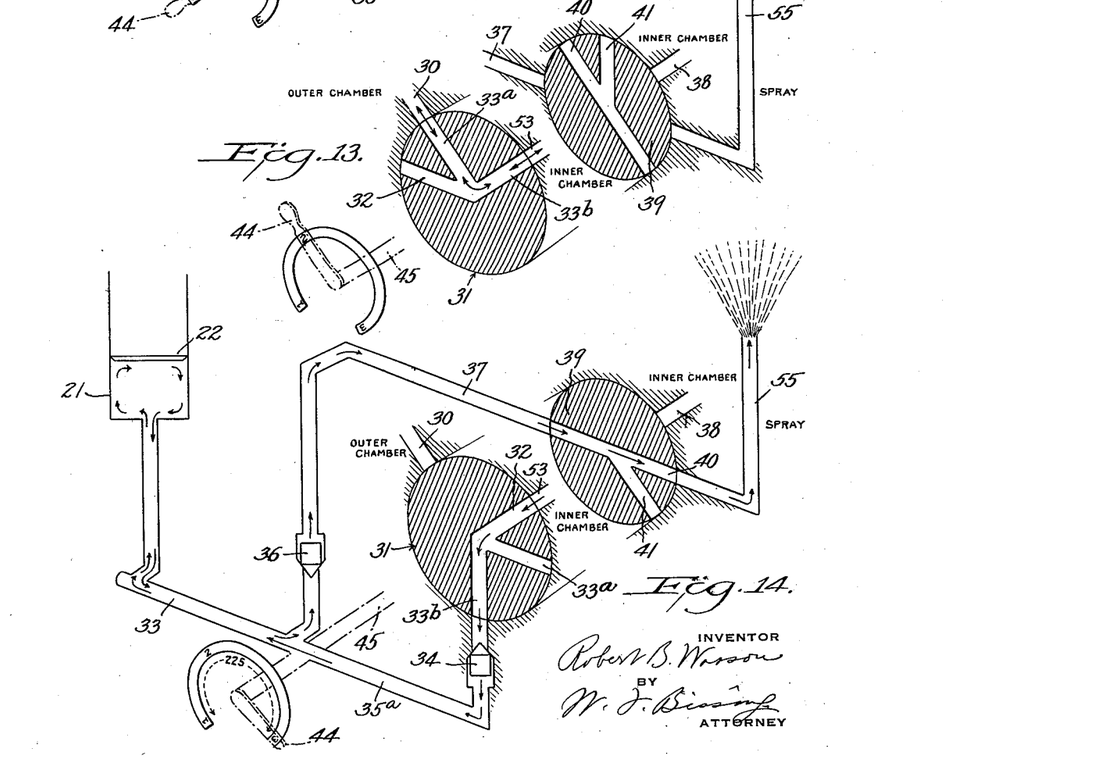

With front upper and lower valves in position 2, the back lower valve with openings 40 and 41 is in such a position as to disconnect the said back valve from the inner chamber and pump (see Figure 13).

Means are provided for disconnecting the inner from the outer chamber and for spraying a part of the caustic solution from the inner chamber into the gas to be tested. The volume of the inner chamber is thus left unaltered. This spray will absorb and combine with the carbon dioxide present in the exhaust gas changing it into a carbonate, which mixes with the caustic. The quantity of the gas specimen will thus be reduced and its pressure diminished. A measuring gage or manometer is provided to measure the resulting pressure, which is translated, by appropriate graduations, on to two manometer scales, one showing the carbon dioxide percentage, and the other the combustion efficiency, the latter giving the completeness of combustion of the gas specimen.

The means for disconnecting the inner from the outer chamber and for connecting the inner chamber with the pump and with the spray, will now be described.

With the lower and upper valves in position 3, see Figures 14, 11, 20 and 19, the lower front valve with its ports 32, 33ª and 33ᵇ, will disconnect the inner chamber from the outer chamber and will connect the inner chamber with the pump. On the suction stroke liquid is sucked from the inner chamber past the check-valve 34, into the pump barrel. On the ejection stroke, liquid is pumped past the check-valve 36, thru the passageway 40 of the back lower valve, into the spray pipe 55, the spray thus entering the gas chamber. This spray pipe is secured in place by any suitable means, such as a removable sleeve-nut 56.

After the spraying operation has removed all of the carbon dioxide from the gas, a reading is taken on the manometer. During and after the spraying operation, the inner chamber is disconnected from the outer chamber. Consequently, no pressure in the outer chamber as by the atmosphere can be transmitted to the inner chamber, and changes of pressure in the inner chamber will be due solely to the absorption of the carbon dioxide in the exhaust gas present in the inner chamber.

Means are provided for performing the measuring operation. The manometer, or U-tube, 57, is connected to the upper or gas-receiving portion of the inner chamber by means of a flexible hose 58, connected to a nipple 59. In order to restore the manometer to its zero reading, the manometer is connected to air by the back upper valve thru passageway 61, valve port 50ᶜ and air port 50ᵇ, when the valves are in their second position, see Figures 10 and 17.

Figure 1:
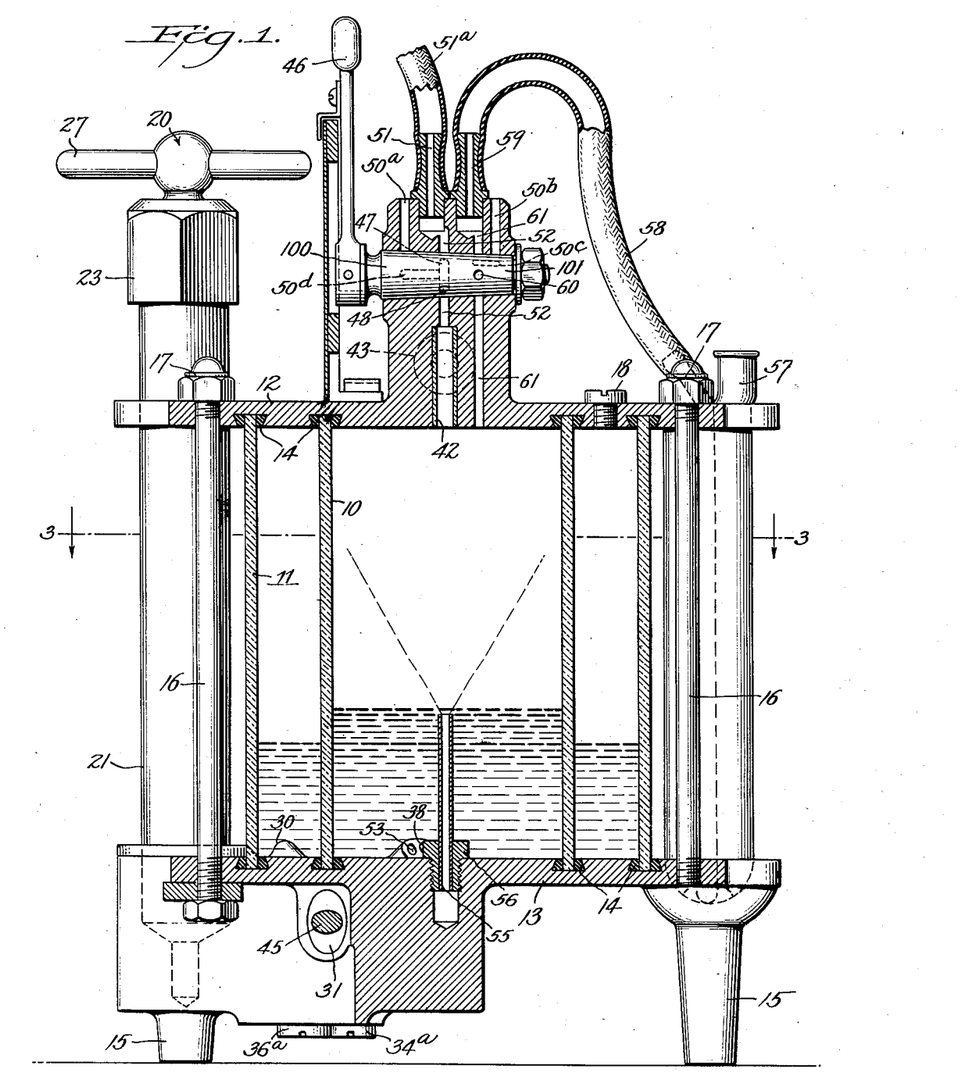
Figure 1, is a vertical sectional view of the apparatus.
Figure 11:
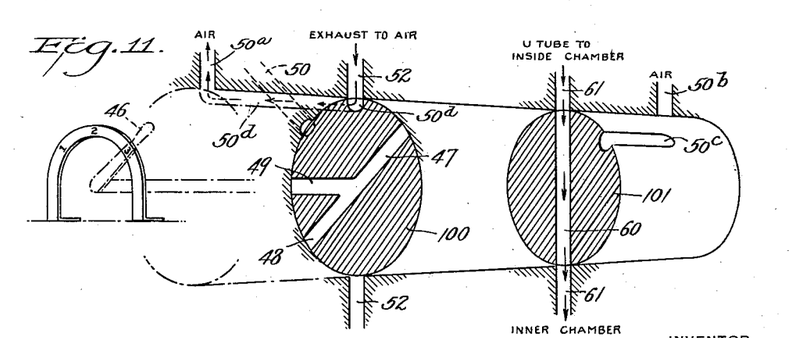

To make the measurement, the back upper valve by means of its passageway 60, connects the manometer with the inner chamber, see Figures 11 and 1, thru passageway 61. In this position, the front upper valve has connected the exhaust from the engine to atmosphere thru valve port 50ᵈ, and air port 50ª, see Figures 1 and 11.

Two scales are provided on the manometer, one giving the percentage of carbon dioxide contained in the gas, and the other giving the translation of this percentage into combustion efficiency as determined by known tables.

Having thus described the construction of the apparatus, its operation will be clear.

When the device is ready for use, the outer and inner chambers are partly filled with a caustic solution and a blanket of oil, say one-quarter of an inch, is poured into the inner chamber, the oil floating on top of the caustic. One of the two nipples in the top of the meter is connected to the exhaust of the engine, and the other to the manometer.

*Position #1.*—In this position the lever which operates the upper valve mechanism is placed in position 1, and the lever for the lower valve mechanism is placed in its position 1. With the parts so positioned, the ports in the upper valve will register so as to open the inner chamber of the meter to atmosphere. The ports in the lower valve mechanism connect the outer chamber to the inner chamber. The pump is then operated, pumping the caustic liquid from the outer chamber into the inner chamber. This operation continues until the caustic liquid, carrying its oil seal, completely fills the inner chamber and may be seen thru the peep hole which is provided for the purpose. The pump piston is then locked at the bottom of its stroke.

*Position #2.*—The upper lever for operating its valve mechanism is now moved to its second position, and the ports of the upper valve mechanism will connect the exhaust of the engine to the inner chamber and the manometer to atmosphere. The lever for the lower valve is moved to its second position. By this the lower valve ports will connect the outer chamber to the inner chamber. The pressure of the exhaust gas which is entering the inner chamber at the top will force the caustic liquid from the inner chamber into the outer chamber until the level of the liquid in the two chambers is the same. The second operation is thus completed.

*Position #3.*—The lever for operating the upper valve mechanism is turned to its position three. The ports in this valve mechanism now register so as to open the exhaust to atmosphere, and connect the manometer to the inner chamber. The lever controlling the lower valve mechanism is moved to its third position, thus connecting the pump to the inner chamber and the spray to the pump. The pump is then operated and will spray into the inner chamber and allow the caustic liquid to absorb the carbon dioxide. The pump piston is locked at the bottom of its stroke thus preserving the volume of the inner chamber. The resulting decreased pressure in the gas-filled portion of the inner chamber is measured by the rising of the column of mercury in the manometer which is connected to the inner chamber. It will be noted that the gas in the inner chamber is at atmospheric pressure when the level of the liquid in the two chambers is the same and that the two chambers are subsequently disconnected so as to preserve the volume of the gas being tested and enable the decreased pressure resulting from the spraying to be measured by the manometer, without the pressure being affected by conditions outside of the chamber.

My apparatus and process may be used for testing gases other than exhaust gases of internal combustion engines for the amount of one or more of the component gases present in the gas mixture being tested and a suitable liquid may be employed for combining with the component gas or gases. The protecting film may also be changed.

One application of the above-described apparatus is that of determining the degree of combustion of the fuel supplied to internal combustion engines, such as the engine of an automobile, by determining the amount of carbon dioxide present in the exhaust gases of such an engine, at the same time measuring the horsepower delivered at the rear wheels of the automobile, and the amount of fuel supplied to the engine.

It will also be understood that numerous changes may be made in carrying the above invention into effect, without departing from the principle of the invention.

What I claim is:

1. An apparatus for determining the amount of carbon dioxide present in the exhaust gas of an internal combustion engine, comprising in combination two communicating chambers, means for spraying caustic liquid into one of said chambers, and means for connecting the exhaust pipe of the engine to said chamber into which the liquid is sprayed.

2. An apparatus for determining the amount of carbon dioxide present in the exhaust gas of an internal combustion engine, comprising in combination, an inner and an outer chamber one communicating with the other, a pump, said apparatus provided with passageways between said pump and said inner chamber so as to permit spraying caustic liquid from said inner chamber into said inner chamber, and means for connecting the exhaust pipe of the engine to said inner chamber.

3. An apparatus for determining the percentage of carbon dioxide present in the exhaust gas of an internal combustion engine, comprising in combination an inner and an outer chamber one communicating with the other, a pump for spraying caustic liquid into said inner chamber, means for connecting the exhaust pipe of the engine to said inner chamber into which the liquid is sprayed, a manometer and means for connecting said manometer with said inner chamber.

4. An apparatus for testing the composition of gases, comprising in combination an inner and an outer chamber one communicating with the other, means for introducing gas into said inner chamber, a pump for spraying a combining liquid into said chamber, a manometer and means for connecting said manometer with said inner chamber.

5. An apparatus for testing the percentage of carbon dioxide present in the products of combustion of gases comprising in combination two chambers, a pump and spray pipe for spraying caustic liquid into one of said chambers, and a pair of valves, one of said valves connecting the pump with one of said chambers and the other valve connecting the pump with said spray pipe.

6. An apparatus for testing the percentage of carbon dioxide present in the products of combustion of gases comprising in combination two chambers, a pump and a spray pipe for spraying caustic liquid into one of said chambers, and a pair of valves, one of said valves provided with means for alternately connecting the outer and inner chamber with the pump during the filling and spraying operations respectively, and the other of said valves provided with means for correspondingly connecting the inner chamber and the spray with the pump, thereby enabling the inner chamber to be filled and the liquid to be sprayed into it.

7. An apparatus for testing the combustion efficiency of a gasoline engine comprising in combination an inner and an outer chamber, a pump for supplying caustic liquid to the inner chamber, means for admitting exhaust gas to the inner chamber, said pump arranged to spray caustic liquid into the gas filled portion of the inner chamber and a pressure indicating gage for measuring the pressure of the gas after it has been sprayed.

8. An apparatus for testing the composition of gases comprising in combination a chamber, means for filling said chamber with a combining liquid, means for admitting gas to be tested to said chamber, so as to displace said liquid, means for spraying a combining liquid into the gas filled portion of the chamber, and a pressure indicating gage for measuring the pressure of the gas after it has been sprayed.

9. An apparatus for testing the amount of carbon dioxide present in the exhaust gas of an internal combustion engine comprising in combination two chambers, a pump for pumping caustic liquid from one into the other of said chambers, and a ported valve mechanism for connecting the said chambers during the pumping operation.

10. An apparatus for testing the amount of carbon dioxide present in the exhaust gas of an internal combustion engine comprising in combination two chambers, a pump for pumping caustic liquid from one into the other of said chambers, and a pair of valves, each provided with a ported passageway for connecting the said chambers during the pumping operation.

11. An apparatus for testing the amount of carbon dioxide present in the exhaust gas of an internal combustion engine comprising in combination two chambers, a pump for pumping caustic liquid from one into the other of said chambers and a pair of valves mounted upon a common valve body, each valve provided with a ported passageway, said pair of valves connecting the said chambers during the pumping operation.

12. An apparatus for testing the percentage of carbon dioxide present in the exhaust gas of an internal combustion engine comprising in combination two chambers, a pump for pumping caustic liquid from one into the other of said chambers, said apparatus provided with a passageway for the liquid between the pump and the two chambers, ported valve mechanism for connecting the two chambers, and a pair of check valves in said passageway.

13. An apparatus for testing the percentage of carbon dioxide present in the exhaust gas of an internal combustion engine comprising in combination two chambers, a pump for pumping caustic liquid from one into the other of said chambers, said apparatus provided with a passageway for the liquid between the pump and the two chambers, said passageway including a main passage and two branch passages, one branch passage leading to one chamber and the other passage to the other chamber, a ported valve mechanism connecting with each branch passage, and a pair of check valves, one for each branch passage.

14. An apparatus for testing the percentage of carbon dioxide present in the exhaust gas of an internal combustion engine comprising in combination two chambers, a pump for pumping caustic liquid from one into the other of said chambers, said apparatus provided with a passageway for the liquid, between the pump and the two chambers, a pair of valves mounted upon a common valve body, said valve body provided with an operating handle for connecting the two chambers and a pair of check valves in said passageway.

15. An apparatus for testing the amount of carbon dioxide present in the exhaust gas of an internal combustion engine, comprising in combination two chambers, means for filling one of said chambers with caustic liquid, means for connecting the exhaust pipe of the engine with said chamber, means for connecting the two chambers so as to permit the liquid in them to reach a common level after the exhaust gas has been admitted, means for disconnecting the exhaust pipe from the gas-containing chamber, and means for measuring the pressure of the gas inside the gas-containing chamber.

16. An apparatus for testing the amount of carbon dioxide present in the exhaust gas of an internal combustion engine, comprising in combination an inner and an outer chamber, means for filling the inner one of said chambers with caustic liquid, means for connecting the exhaust pipe of the engine with said chamber, means for connecting the two chambers so as to permit the liquid in them to reach a common level after the exhaust gas has been admitted, means for disconnecting the outer chamber from the gas-containing inner chamber, means for disconnecting the exhaust pipe from the inner chamber, and means for measuring the pressure of the gas inside the inner chamber.

17. An apparatus for testing the amount of carbon dioxide present in the exhaust gas of an internal combustion engine comprising in combination two chambers, a valve mechanism connecting the two chambers, thereby permitting the admission of a caustic liquid into one of said chambers from the other chamber, a valve for connecting and disconnecting the exhaust pipe of the engine to one of said chambers, thereby filling said chamber with gas, means whereby said first-named valve mechanism connects the two chambers thereby permitting the liquid to reach a common level in them, and thereafter disconnects the two chambers, and a pressure gage for measuring the pressure in the chamber to which the exhaust pipe is connected.

18. An apparatus for testing the amount of carbon dioxide present in the exhaust gas of an internal combustion engine comprising in combination an inner and an outer chamber, a valve mechanism for connecting the two chambers, a pump and spray for spraying caustic liquid into one of said chambers, means for connecting and disconnecting the exhaust pipe of the engine to said chamber, a second valve mechanism for controlling the said exhaust pipe connection, means whereby said first-named valve mechanism connects the two chambers thereby permitting the liquid to reach a common level in them and thereafter disconnects the two chambers, and a pressure gage for measuring the pressure in the chamber to which the exhaust pipe is connected.

19. A carbon dioxide testing apparatus comprising in combination a pair of plates, an inner and an outer chamber between said plates, said plates closing the ends of said chambers, a valve mechanism carried by each of said plates, one of said valve mechanisms controlling the admission of gas to the inner chamber and the connection of a manometer thereto, the other of said valve mechanisms controlling the admission of a caustic liquid to the inner chamber.

20. A carbon dioxide testing apparatus comprising in combination a pair of plates, an inner and an outer chamber between said plates, said plates closing the ends of said chambers, a valve mechanism carried by each of said plates, one of said valve mechanisms controlling the admission of gas to the inner chamber and the connection of a manometer thereto, a pump barrel connecting the two plates, a pump piston mounted in said barrel, said pump barrel being connected to the inner chamber so as to pump liquid thereinto, the other of said valve mechanisms controlling the admission of the liquid supplied by the pump.

21. A carbon dioxide testing apparatus comprising in combination a pair of plates, an inner and an outer chamber between said plates, one of said plates being provided for the top of said chambers and the other for supporting said chambers, said plates closing the ends of said chambers, a valve mechanism carried by each of said plates, one of said valve mechanisms controlling the admission of gas to the inner chamber and the connection of a manometer thereto, a position-indicating dial and valve handle for one of said valve mechanisms, said other valve mechanism being, likewise, provided with a position-indicating dial and valve handle, a pump barrel connecting the two plates, a pump piston mounted in said barrel, said pump barrel being connected to the inner chamber so as to pump liquid thereinto, the other of said valve mechanisms controlling the admission of the liquid supplied by said pump.

22. A carbon dioxide testing apparatus comprising in combination a pair of plates, an inner and an outer chamber between said plates, one of said plates being provided for the top of said chambers and the other for supporting said chambers, said plates closing the ends of said chambers, connecting rods passing between said plates and arranged around the outer chamber so as to guard the same, a valve mechanism carried by each of said plates, one of said valve mechanisms controlling the admission of gas to the inner chamber and the connection of a manometer thereto, a pump barrel connecting the two plates, a pump piston mounted in said barrel, said pump barrel being connected to the inner chamber so as to pump liquid thereinto, the other of said valve mechanisms controlling the admission of the liquid supplied by said pump.

23. A carbon dioxide testing apparatus comprising in combination a pair of plates, an inner and an outer chamber between said plates, said plates closing the ends of said chambers, a valve mechanism carried by each of said plates, one of said valve mechanisms controlling the admission of gas to the inner chamber, a pump barrel connecting the two plates, a pump piston mounted in said barrel, said pump barrel being connected to the inner chamber so as to pump liquid thereinto, the other of said valve mechanisms controlling the admission of a caustic liquid supplied by said pump, and a manometer arranged between the two plates, said manometer being connectible to the inner chamber by the first-named valve mechanism.

24. A carbon dioxide testing apparatus comprising in combination an inner and an outer chamber, means for filling the inner chamber with liquid, means for admitting gas containing carbon dioxide to be tested to the inner chamber so as to displace the liquid, a manometer and means for connecting said manometer with the gas-containing chamber.

25. A carbon dioxide testing apparatus comprising in combination an inner and an outer chamber, means for filling the inner chamber with liquid, means for admitting gas containing carbon dioxide to be tested, to the inner chamber, so as to displace the liquid, means for introducing a caustic liquid into the gas containing chamber, a manometer and means for connecting said manometer with the gas-containing chamber.

26. A carbon dioxide testing apparatus comprising in combination an inner and an outer chamber, means for filling the inner chamber with liquid, means for admitting gas containing carbon dioxide to be tested, to the inner chamber, so as to displace the liquid, means for introducing a caustic liquid into the gas-containing chamber, a manometer and a valve mechanism for first connecting the manometer with atmosphere and thereafter connecting it with the gas-containing chamber.

27. An apparatus for testing the combustion efficiency of a gasoline engine comprising in combination a chamber, means for supplying caustic liquid to said chamber, means for connecting said chamber with the exhaust pipe of the engine, thereby admitting gas to be tested, and a gage connectible with said chamber, said gage provided with two scales, one showing the carbon dioxide percentage and the other the completeness of combustion of the fuel under test.

28. An apparatus for testing gaseous products of combustion, comprising a chamber, means for introducing into said chamber the gases to be tested, means for introducing a carbon dioxide absorbing medium into the chamber, and means for filling said chamber with liquid, thereby expelling the residual gases from said chamber after the carbon dioxide has been absorbed.

29. The process of determining the percentage of carbon dioxide present in gases, which consists in filling a chamber with a liquid, admitting gas to be tested to the chamber, thus displacing the liquid, injecting into the chamber a caustic solution and determining the resultant pressure of the gas in the chamber.

30. The process of determining the percentage of carbon dioxide present in exhaust gases, which consists in filling a chamber with a liquid, admitting gas to be tested to the chamber, thus displacing the liquid, spraying into the chamber a caustic solution and determining the resultant pressure of the gas in the chamber.

31. The process of determining the composition of gases which consists in filling a chamber with liquid, admitting gas to be tested to the chamber, thus displacing the liquid, injecting into the chamber a combining solution and determining the resultant pressure of the gas in the chamber.

32. The process of testing gaseous products of combustion for carbon dioxide, which comprises introducing the products of combustion into a chamber against a movable member, thereby displacing the member, absorbing the carbon dioxide from the products of combustion, and measuring the products of combustion after such absorption thereby indicating the carbon dioxide content.

33. The process of testing gaseous products of combustion for carbon dioxide, which comprises introducing the products of combustion into a chamber against a movable member, thereby displacing the member, absorbing the carbon dioxide from the products of combustion, measuring the products of combustion after such absorption, thereby indicating the carbon dioxide content, and then returning the member into said chamber so as to discharge the products of combustion therefrom.

34. The process of testing gaseous products of combustion for carbon dioxide, which comprises introducing the products of combustion into a chamber against a movable liquid, thereby displacing the liquid, absorbing the carbon dioxide from the products of combustion, measuring the products of combustion after such absorption, thereby indicating the carbon dioxide content, and then returning the liquid into said chamber so as to discharge the products of combustion therefrom.

In witness whereof, I have signed my name to this specification.

ROBERT B. WASSON.